US011854016B1

(12) United States Patent
Pillarisetty et al.

(10) Patent No.: US 11,854,016 B1
(45) Date of Patent: Dec. 26, 2023

(54) METHOD AND SYSTEM FOR IMPLEMENTING PERFORMANCE AND VOLUME TESTING FOR CREDIT CARD AUTHORIZATION SYSTEMS

(71) Applicant: JPMorgan Chase Bank, N.A., New York, NY (US)

(72) Inventors: Venkatasai Jagan Mohan Pillarisetty, Bear, DE (US); Mohit Matta, Bear, DE (US); Praveen Chandra Namala, Middletown, DE (US); Ravi Teja Vegesna, Newark, DE (US); Hari Kishore Chitneni, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 502 days.

(21) Appl. No.: 15/479,355

(22) Filed: Apr. 5, 2017

Related U.S. Application Data

(60) Provisional application No. 62/318,372, filed on Apr. 5, 2016.

(51) Int. Cl.
*G06Q 20/00* (2012.01)
*G06Q 20/40* (2012.01)

(52) U.S. Cl.
CPC ......... *G06Q 20/409* (2013.01); *G06Q 20/405* (2013.01)

(58) Field of Classification Search
CPC ........ G06F 17/60; G06Q 20/00; G06Q 20/20; G06Q 20/32; G06Q 20/40; G06Q 20/202; G06Q 30/00; G06Q 40/00; G06Q 40/02; G06Q 20/02; G06Q 20/405; G06Q 20/409

USPC .................................................. 705/4, 35–45
See application file for complete search history.

(56) References Cited

U.S. PATENT DOCUMENTS

| | | | | |
|---|---|---|---|---|
| 6,847,953 | B2 * | 1/2005 | Kuo | G06Q 20/04 705/1.1 |
| 8,073,772 | B2 * | 12/2011 | Bishop | G06Q 20/04 705/39 |
| 9,449,320 | B1 * | 9/2016 | Walters | G06Q 20/40 |
| 2003/0140007 | A1 * | 7/2003 | Kramer | G06Q 20/12 705/40 |
| 2010/0017328 | A1 * | 1/2010 | Stephen | G06Q 20/04 705/43 |
| 2013/0226782 | A1 * | 8/2013 | Haggerty | G06Q 40/02 705/38 |

(Continued)

*Primary Examiner* — Jessica Lemieux
*Assistant Examiner* — Mohammed H Mustafa
(74) *Attorney, Agent, or Firm* — Greenblum & Bernstein, P.L.C.

(57) ABSTRACT

An embodiment of the present invention is directed to a performance and volume testing for credit card authorization systems. A system that implements performance and volume testing for credit card authorizations comprises: a memory component that stores performance and volume data; a communication interface that supports communication via TCP/IP and a testing tool comprising a processor coupled to the memory component and programmed to: parse data in a message format for use in performance testing; send load volumes to a system under test to gather metrics, the system under test hosts a credit card authorization application; and collect data from production logs in a message format used to replay authorizations against the credit card authorization application.

12 Claims, 15 Drawing Sheets

(56) References Cited

U.S. PATENT DOCUMENTS

2013/0238499 A1\* 9/2013 Hammad ........... G06Q 20/4018
705/44
2014/0324699 A1\* 10/2014 Ding .................. G06Q 20/4016
705/44

\* cited by examiner

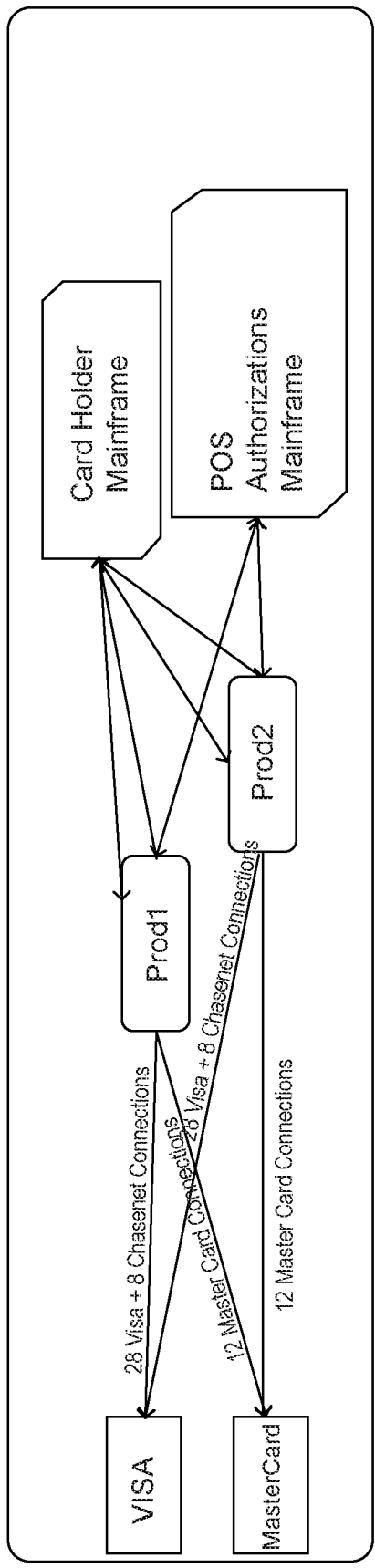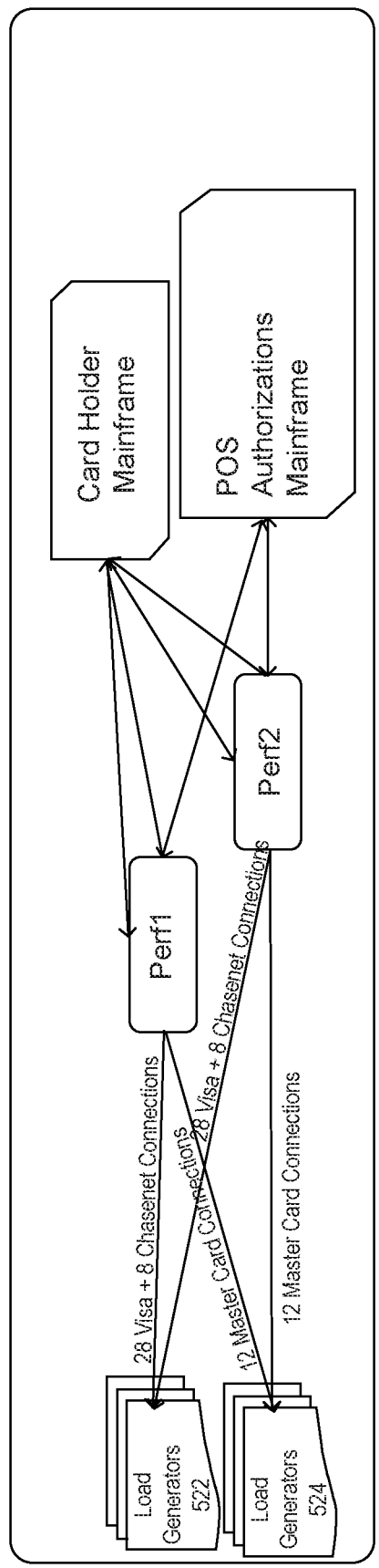
Figure 5

| Classes in Custom Jar | |
|---|---|
| VisaMessage.java | Manipulation of Visa Message |
| VisaServer.java | Visa Server Program (Main), Opens Server Connections, closes, sends messages, checks against array |
| MastercardMessage.java | Manipulation of MasterCard Message |
| MastercardServer.java | Mastercard Server Program (Main), Opens Server Connections, closes, sends messages, checks against array |
| PaymentTechClient.java | Client Program to open connection |
| PaymentTechMessage.java | Message Format, fetch RRN, validate message |
| RetailClient.java | Client Program to open connection |
| RetailMessage.java | Message Format, fetch RRN, validate message |
| Test.java | Standard Timer, High Resolution Timer, |
| Transaction.java | get message, set message, te end ts, set start ts, transaction rrn, string, long STS |
| TransactionArray.java | Creates and works with the Transaction Array, called by Mastercardserver and visaserver |
| util.java | Utilities - Str to Hex, to Ascii, EBCDIC to Ascii, Ascii HEX dump, Valid Unique Id |

710 — VisaMessage.java, VisaServer.java
712 — MastercardMessage.java, MastercardServer.java
714 — PaymentTechClient.java, PaymentTechMessage.java
716 — RetailClient.java, RetailMessage.java
718 — Test.java, Transaction.java, TransactionArray.java, util.java

| 7 | 2 | 2 | 4 | 4 | 6 | 4 | 8 | 1 | 2 | 8 | E | 0 | 8 | 0 | 1 | 2 |
|---|---|---|---|---|---|---|---|---|---|---|---|---|---|---|---|---|
| 0111 | 0010 | | 0100 | 0100 | 0110 | 0100 | 1000 | 0001 | 0010 | 1000 | 1110 | 0000 | 1000 | 0000 | 0001 | 0010 |
| | | | 0 (0000) Expiry Date missing (<1%) | | | | | | 2 (0010) Track2 Present (45%) 0 (0000) Trak2 Missing (55%) | | 6 (0110) Terminal Id Missing (24%) | 8 (1000) Track1 Data Present (13%) 0 (0000) Track1 Data Missing (87%) | | 2 (0010) EMV Present | | |

| Field | Description |
|---|---|
| 1 | Bit map |
| 2 | Primary Account Number |
| 3 | Processing code |
| 4 | Amount, Transaction |
| 5 | Amount, settlement |
| 6 | Amount, cardholder billing |
| 7 | Transmission Date and Time |
| 8 | Amount, cardholder billing fee |
| 9 | Conversion rate, settlement |
| 10 | Conversion rate, cardholder billing |
| 11 | Systems Trace Audit Number |
| 12 | Time, local transaction (hhmmss) |
| 13 | Date, local transaction (MMDD) |
| 14 | Date, Expiration |
| 15 | Date, settlement |
| 16 | Date, conversion |
| 17 | Date, capture |
| 18 | Merchant Type |
| 19 | Country Code |
| 20 | PAN extended, country code |
| 25 | Point of service condition code |
| 26 | Point of service capture code |
| 27 | Authorizing Id response length |
| 28 | Amount, transaction fee |
| 21 | Forwarding institution, Country Code |
| 22 | PDS Entry Mode |
| 23 | Application PAN sequence number |
| 24 | Network international identifier (NII) |
| 29 | Amount, settlement fee |
| 30 | Amount, Txn processing fee |
| 31 | Amount, Settlement processing fee |
| 32 | Acquiring institution Id code |
| 33 | Forwarding institution Id code |
| 34 | PAN, Extended |
| 35 | Track 2 data |
| 36 | Track 3 data |
| 37 | Retrieval reference number |
| 38 | Authorization ID response |
| 39 | Response code |
| 40 | Service restriction code |
| 41 | Terminal Id |
| 42 | Id Code |
| 43 | Card Acceptor name Location |
| 44 | Additional response data |
| 45 | Track 1 data |
| 46 | Additional data - ISO |
| 47 | Additional data - national |
| 48 | Additional data - private |
| 49 | Currency code, transaction |
| 50 | Currency code, settlement |
| 51 | Currency code, cardholder billing |
| 52 | Personal ID number data |
| 53 | Security related control info |
| 54 | Additional amounts |
| 55 | EMV Data |
| 56 | Reserved ISO |
| 57 | Reserved national |
| 58 | Reserved national |
| 59 | Reserved national |
| 60 | Additional POS Information |
| 61 | Reserved private |
| 62 | Reserved private |
| 63 | VIP SMS private use fields |
| 64 | Message authentication code (MAC) |

```
00AD00016010200AD00000000000000000000000000000000000
0000000000001402101409355200954617105411084090140...
0094F4F1F4F6F5F0F3F2F0F1F8F8F0F0F8F5F0F9F0F0F8F8F2F3F8404D2C9D5C740E2D6D6
D7C5D9E2407BF0F0F0F9404040404040E4E2084001420580000000002
```

910

```
00AD0000160102OOAD00000000000000000000000000000000007224648128E080121042661234567890l2
000000000000000000001402101409355200954617105411084090100006444500020426612345678901l2DL7101011000
0094F4F1F4F6F5F0F3F2F0F1F8F8F0F0F0F9F0F0F8F5F4F4F4F5F0F9F8F8F2F3F84040D2C9D5C740E2D6D6
D7C5D9E2407BF0F0F0F9404040404040C6E34B40C3D6D3C9D5E24040014205800000000002

00AD0000160102OOAD000000000000000000000000000000000000000 - Header
0100 - Type of Message - 0100 Authorization
7224648128E08012 Bitmap
1042661234567890l2 - PAN
000000 - Processing Code
000000001402 - Amount
101409355200954617105411084O
9010 - POS Entry Mode
00 - POS Condition Code
06444500 - Acquiring Institution
20426612345678901l2DL71010110000094 - Track2Data (Field 35) - Value : Length 20 Card Number 426612345678901l2
  Seperator D Expiry Date 1710 ???? 101l0000094
F4F1F4F6F5F0F3F2F0F1F8F8 - RRN (Field 37) - Value : 4146503201l88
F0F0F9F0F0F8F5 - Terminal Id (Field 41) - Value: 00090085
F4F4F4F5F0F9F0F9F8F8F2F3F8 - Card Acceptor Info (42) - Value: 4445090988238
4040D2C9D5C740E2D6D6D7C5D9E2407BF0F0F0F940404040404040C6E34B40C3D6D3C9D5E24040E4E20 - Card Acceptor Name
(43)
840 - Currency code (US) (49)
0142 - Additional POS Info (60)
058000000002 (Additional Field ) 63
```

Figure 10

METHOD AND SYSTEM FOR IMPLEMENTING PERFORMANCE AND VOLUME TESTING FOR CREDIT CARD AUTHORIZATION SYSTEMS

CROSS REFERENCE TO RELATED APPLICATIONS

The application claims priority to U.S. Provisional Application 62/318,372, filed Apr. 5, 2016, the contents of which are incorporated herein in its entirety.

FIELD OF THE INVENTION

The present invention generally relates to performance and volume testing of credit card authorization systems.

BACKGROUND OF THE INVENTION

Applications today undergo performance testing for stability and scalability. There are challenges in performance testing a Credit Card Authorizations Application due to the volume of data involved as well as the specific protocol and nature of the application. Today, most performance testing tools support Web application performance testing, web services testing and other protocols, but there is currently no solution to performance test a Credit Card Authorizations System as the communications occur over TCP/IP with all data transactions adhering to the ISO8583 format.

These and other drawbacks exist.

SUMMARY OF THE INVENTION

Accordingly, one aspect of the invention is to address one or more of the drawbacks set forth above. According to an embodiment of the present invention, an automated computer implemented system that implements performance and volume testing for credit card authorizations comprises: a memory component that stores performance and volume data; a communication interface that supports communication via TCP/IP and a testing tool comprising a processor coupled to the memory component and programmed to: parse data in a message format for use in performance testing; send load volumes to a system under test to gather metrics, the system under test hosts a credit card authorization application; and collect data from production logs in a message format used to replay authorizations against the credit card authorization application.

According to another embodiment of the present invention, an automated computer implemented method that implements performance and volume testing for credit card authorizations comprises the steps of: parsing, via a testing tool, data in a message format for use in performance testing; sending load volumes to a system under test to gather metrics, the system under test hosts a credit card authorization application; and collecting, via a testing tool, data from production logs in a message format used to replay authorizations against the credit card authorization application; wherein the testing tool comprising a processor coupled to the memory component and supporting communication via TCP/IP.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 5 is an exemplary authorization landscape, according to an embodiment of the present invention.

FIG. 7 is an exemplary illustration of classes, according to an embodiment of the present invention.

FIG. 9 illustrates an exemplary ISO Message.

FIG. 10 illustrates an exemplary ISO Message.

DESCRIPTION OF EMBODIMENTS OF THE INVENTION

Figure 1:
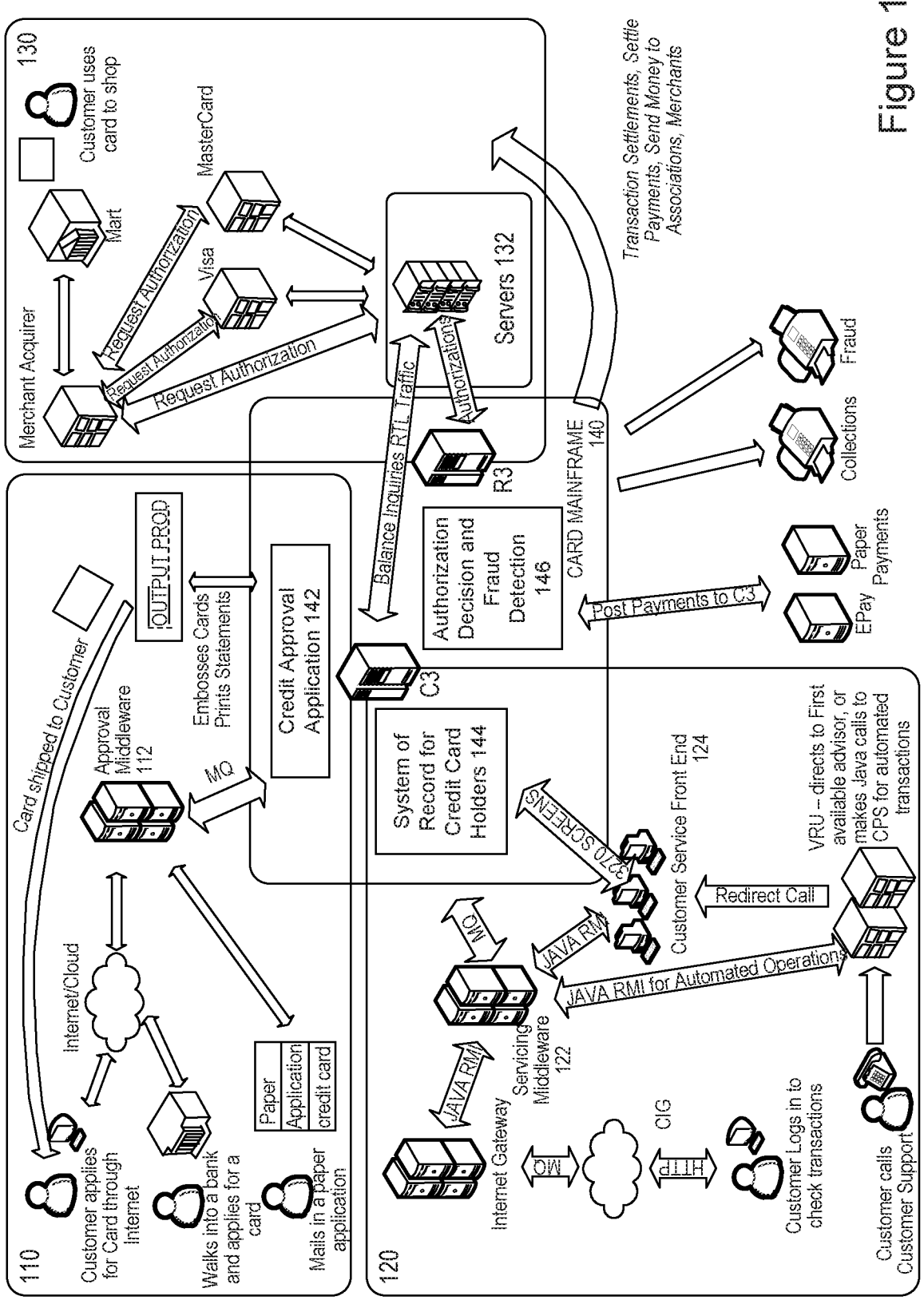
FIG. 1 is an exemplary illustration of opening a card account; maintaining card service (e.g., servicing) and making purchases (e.g., authorizations).

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to performance and volume testing of transaction type authorizations systems. An embodiment of the present invention simulates real-life patterns associated with credit card and other types of transactions, handles large volumes of data associated with such transactions and further supports TCP/IP communications and specific message formats. Other embodiments of the present invention may be directed to testing debit card as well as other types of transactions.

Credit card authorization refers to the process of confirming whether a customer's credit card has sufficient credit to purchase goods or services from a merchant or other providers. Authorization also confirms whether a credit card is valid or not. A cardholder may present a card to pay for purchases at a merchant. The merchant processes the card and transaction information and requests an authorization from a merchant bank. The merchant bank submits the authorization request to a credit card network. The credit card network sends the request to the card issuer. The card issuer then approves or declines the transaction. An embodiment of the present invention is directed to testing an environment between the credit card network (e.g., Visa, Mastercard, etc.) and the card issuer (e.g., Financial Institution, Bank, etc.).

According to an embodiment of the present invention, a credit card testing framework may include a combination of: (1) Custom Code written on top of a software testing tool that supports TCP/IP communication; (2) Custom Code that supports parsing of data in a specific format, such as ISO8583 message format, for use in Performance Testing; and (3) Collection of data from Production logs (which may be in ISO8583 format) that may be used to replay Authorizations against a Credit Card Application System. According to an exemplary embodiment, the software testing tool may test applications and measure system behavior and performance under load.

An embodiment of the present invention is directed to mainframe application and infrastructure production simulation testing. For example, an embodiment of the present invention verifies new and/or existing application code on the Mainframe and supporting infrastructure in a production-like environment; verifies infrastructure changes (e.g., Maintenance Release, Hardware/Software Upgrades, etc.) with applications; scales testing to production, or near-production, workloads; validates fail-over/recovery scenarios in a production-like environment; simulates component failures in the environment and system behavior under stress conditions; and finds processing ceilings (e.g., maximum transaction per second, and other metrics).

FIG. 1 is an exemplary illustration of opening a card account; maintaining card service (e.g., servicing) and making purchases (e.g., authorizations). As illustrated in FIG. 1, opening a card account, shown by 110, may be performed through an online website; an in-person interaction as well as mailing in the application. Other forms of communication may be used to open a card account. Maintaining the card through servicing, shown by 120, may include internet communications as well as customer support contacts. Purchases, shown by 130, may be made through various channels, involving various merchants and/or other contacts. To support this and other functionality, Card Mainframe 140 may include Credit Approval Application 142, System of Record 144 and Authorization Decision and Fraud Detection 146. Credit Approval Application 142 communicates with Approval Middleware 112; System of Record 144 communicates with Customer Service Front End 124 and Servicing Middleware 122; and Authorization Decision and Fraud Detection 146 communicates with Servers 132.

Figure 2:
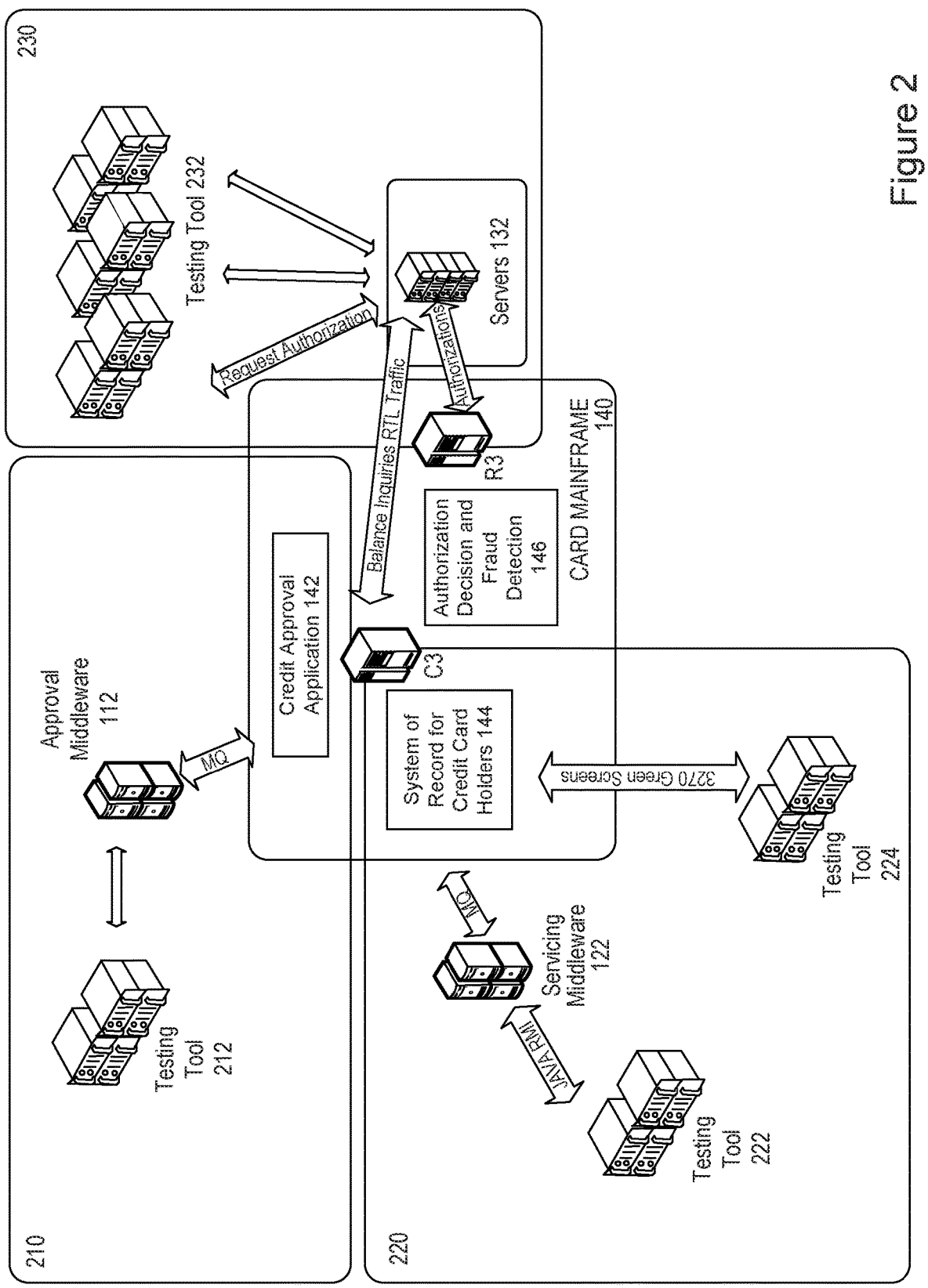
FIG. 2 is an exemplary illustration of opening a card account; maintaining card service (e.g., servicing) and making purchases (e.g., authorizations), according to an embodiment of the present invention.

FIG. 2 is an exemplary illustration of opening a card account; maintaining card service (e.g., servicing) and making purchases (e.g., authorizations), according to an embodiment of the present invention. FIG. 2 illustrates integration of testing tools that accurately simulate conditions, according to an embodiment of the present invention. Opening a card account, shown by 210, may be simulated through a software testing tool 212, which communicates with Approval Middleware 112 and Credit Approval Application 142. Maintaining the card through servicing, shown by 220, may be measured using a software testing tool 222, which communicates with Servicing Middleware 122. Testing Tool 224 communicates with System of Record 144. In addition, purchases, shown by 230 may be simulated and measured through a software testing tool 232, which communicates with Servers 132.

According to an embodiment of the present invention, Authorizations Data Files may be based on actual production traffic. The log files may be parsed and provided in a format, such as ISO8583, for parsing. Settlement Files may include Operation Teams having routines that copy each day's settlement files, card profile, merchant profiles from Production into the test environment. An embodiment of the present invention recognizes that Daily Authorization Log Files are incredibly large in size—up to 6 GB of data per day. Custom patches may be used resolve file size issues. And, Custom Java Code may be implemented to handle communication with Java.

An embodiment of the present invention is directed to supporting the protocol needed to test an Authorizations System that uses TCP/IP Communication and a special message format required for Authorizations called ISO8583, for example.

Figure 3:
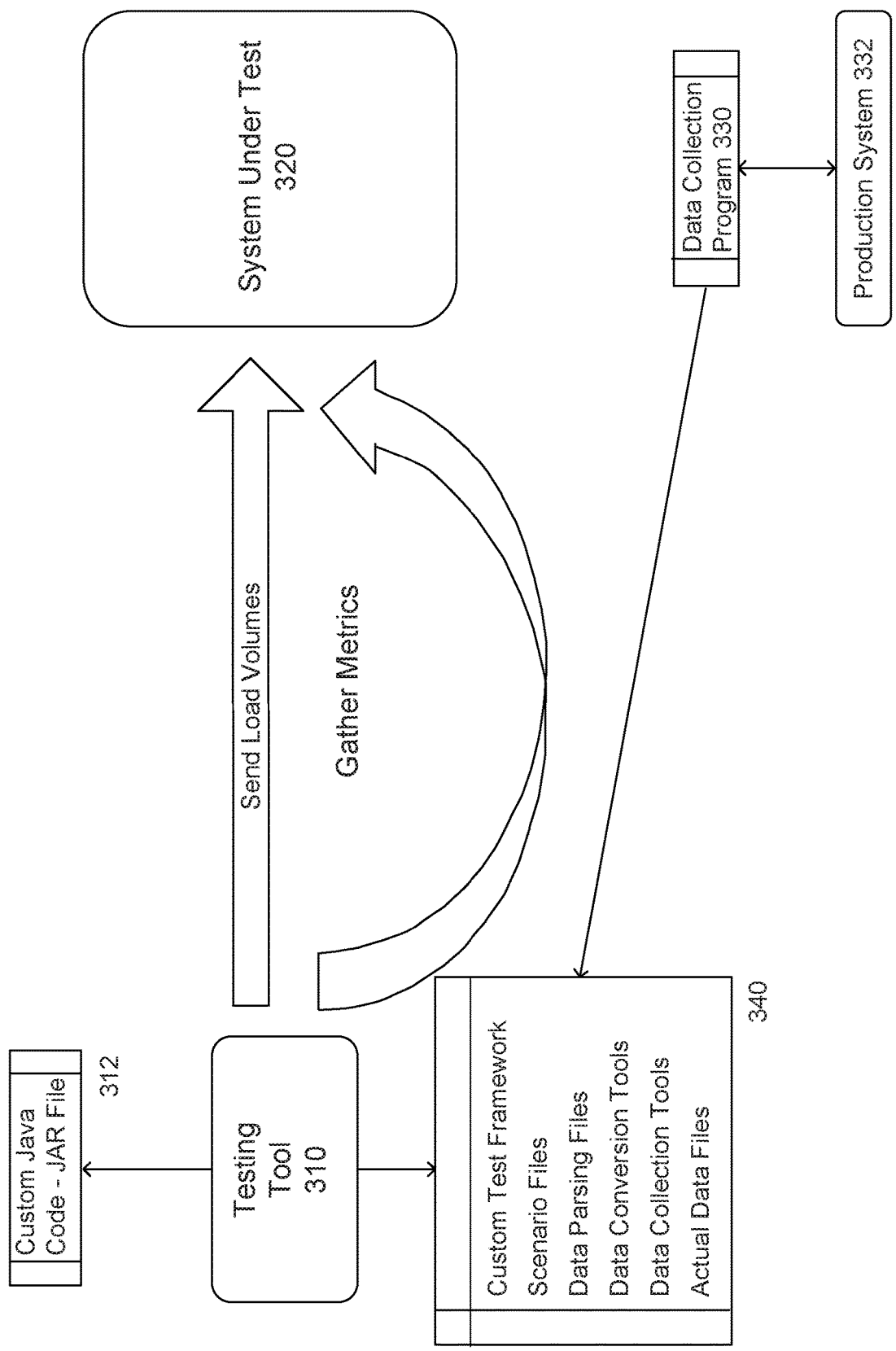
FIG. 3 is an exemplary test framework, according to an embodiment of the present invention.

FIG. 3 is an exemplary test framework, according to an embodiment of the present invention. Authorization data files may be received for a given time period, e.g., a day, 24 time period, and split into multiple files. Each file may be played against a single "line handler" on tandem. As shown in FIG. 3, Testing Tool 310 may send load volumes to System Under Test 320, where metrics may be gathered. Testing Tool 310 may execute custom code, as represented by 312. System Under Test may include a Hardware Platform (e.g., fault tolerant computer systems) on which a Credit Card Authorizations Application may be hosted. As shown in FIG. 3, Data may be collected by a Data Collection Program 330 from a Production System 332 and then stored in a memory component. The memory component may include Custom Test Framework, Scenario Files, Data Parsing Files, Data Conversion Tools, Data Collection Tools and Actual Data Files, as represented by 340.

As recognized by an embodiment of the present invention, an application under test (AUT) may act as a client and not as a server. Traditional performance testing solutions may be designed to replicate the client server model, with the system under test acting as a Server, and the load testing tools acting as a Client. Accordingly, current native test solutions do not enable the tool to behave as a "Server." In the case of the Authorizations Applications, the roles may be reversed. For example, the Authorization system may act as a client when establishing connection, the load testing tool may open up server sockets as a Server.

According to an embodiment of the present invention, custom Java Programming may be written as implemented in a Java Vuser template type, for example. Leveraging the programming, a Load Test tool may open a Socket as a "Server" waiting for the AUT to connect. Prior to the test, a "Load Generator to Tandem Map" may be sent to a Configuration Team. In this example, the configuration may tell the SUT where it should connect. This file may be implemented by a Config team and as soon as the AUT comes up it "seeks" the addresses and ports of Load Generators. If a "Server program" is up and running at that time, they connect and the transactions flow from Server to Client and back. If Load Generators are not up and the AUT cannot find them, it then "waits" for the server connections to come up.

Figure 4:
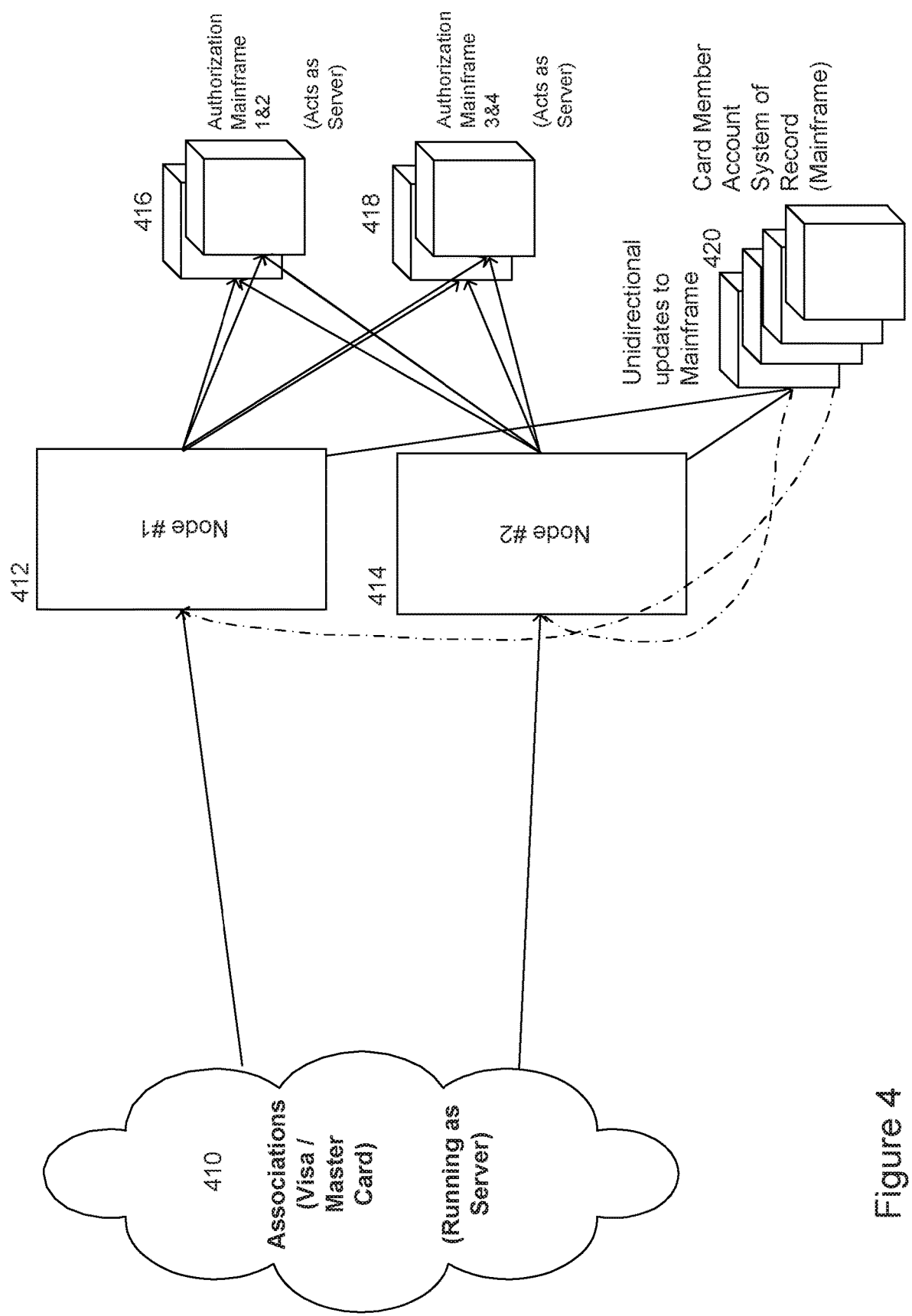
FIG. 4 is an exemplary system under test, according to an embodiment of the present invention.

FIG. 4 is an exemplary system under test, according to an embodiment of the present invention. A Load Testing solution may simulate Associations, such as Card Associations like Visa, for example, represented by 410. Node #1, represented by 412, may connect to Associations 410 like a client and fetch records. Similarly, Node #2, represented by 414, may connect to Associations 410 like a client and fetch records. Further, Nodes 412 and 414 may communicate with Authorization Mainframe 416 and Authorization Mainframe 418. In this example, Mainframes 416 and 418 may each act as a Server. According to another example, Mainframe 420 may send inquiries to Nodes 412, 414 where Mainframe 420 acts as a client and Nodes 412, 414 act as a server. Nodes 412, 414 may send unidirectional updates to Mainframe 420. In this example, Mainframe 420 represents card member account system of records. Other sources of data may also be represented and implemented.

FIG. 5 is an exemplary authorization landscape, according to an embodiment of the present invention. FIG. 5 illustrates Card Production at 510 and Card Performance at 520. As shown at 520, Load Generators 522, 524 may be integrated. According to an exemplary embodiment, authorization lines may be simulated; and authorization data files may be created, transferred, converted and loaded. For example, each authorization data file may have approximately 250,000 records. And, total records may be replayed in one single test—e.g., 14-20 mm transactions. Accordingly, an embodiment of the present invention may realize a large number of TCP/IP line handlers (e.g., total of approximately a hundred or more) on which authorizations flow.

Figure 6:
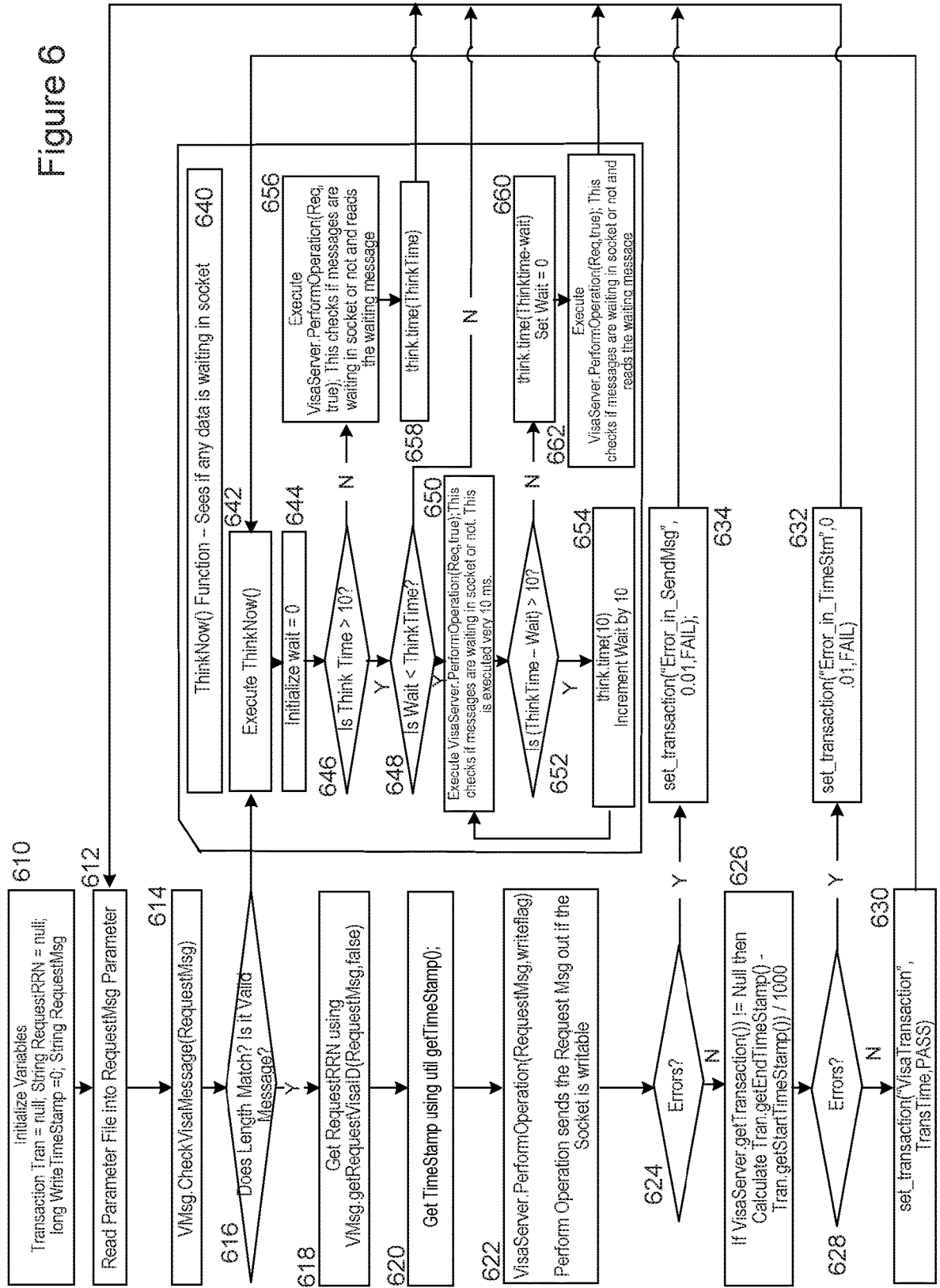
FIG. 6 is an exemplary asynchronous TCP/IP communication script, according to an embodiment of the present invention.

FIG. 6 is an exemplary asynchronous TCP/IP communication script, according to an embodiment of the present invention. An embodiment of the present invention may consider multiple types of scripts, including Visa Script, Mastercard Script, for example. According to an embodiment of the present invention, one script may be associated with one line hander. Each script may use a plurality of classes from a custom jar, e.g., "server" class for connection management; "msg" class for string validation; "util" class for timestamp generationr and "tran" class for timestamp and transaction time calculations. An embodiment of the present invention recognizes that a new script may be implemented to handle messages from a new association, for example. Other variations may be implemented.

As shown in FIG. 6, variables may be initialized at step 610. Parameter file may be read into a requesting parameter, at step 612. Request messages may be checked at step 614. A determination as to whether a length matches and whether the message is valid may be performed at step 616. A get request process may be applied at step 618. A get timestamp may be applied at step 620. Perform operation may send a request message, at step 622. An error check may be performed at step 624. If no errors are found, a server get transaction may be processed at step 626. An additional error check may be performed at step 628. A set transaction process may be applied at step 630. If errors are detected, a set transaction may be performed at step 632 and/or step 634.

If a length does not match at step 616, a ThinkNow function to determine if any data is waiting in a socket is performed, as shown by step 640. At step 642, a ThinkNow function may be executed. Initialization may be performed at step 644. A determination as to whether Think Time is greater than 10 (or other parameter or variable) may be performed at step 646. If not, a perform operation may be executed, at step 656, to check if messages are waiting in socket or not and then reads the waiting message. A Think Time step may be performed at step 658. If Think Time is less than 10 (or other parameter or variable), a determination as to whether Wait is less than Think Time may be performed at step 648. A perform operation may be executed, at step 650, to check if messages are waiting in socket or not. This step may executed at a predetermined time period, e.g., every 10 ms.

A Think Time determination may be performed at step 652. Think Time may be incremented at step 654. A Set Wait may be set to zero at step 660. A perform operation may be executed at step 662, to check if messages are waiting in socket or not and then reads the waiting message. The order illustrated in FIG. 6 is merely exemplary. While the process of FIG. 6 illustrates certain steps performed in a particular order, it should be understood that the embodiments of the present invention may be practiced by adding one or more steps to the processes, omitting steps within the processes and/or altering the order in which one or more steps are performed.

FIG. 7 is an exemplary illustration of classes, according to an embodiment of the present invention. As shown in FIG. 7, Section 710 represents classes used by a Visa Script across Visa Lines and Bank script against Bank lines. Section 712 represents classes used by Mastercard Script across Mastercard Lines. Section 714 represents classes used by other Custom lines. Section 716 represents classes not currently used in this example. Section 718 represents internal classes called by the above sections for transaction management. FIG. 7 is merely one example of specific classes. Other classes may be implemented in accordance with the various embodiments of the present invention.

As recognized by an embodiment of the present invention, transactions simulated in a performance test mirror production patterns in terms of Amount Spend to account, Merchant and Location constraints.

An embodiment of the present invention is directed to an Authorization Decision Engine (ADE) that makes real time approval decisions on the Credit Card purchases and/or other transactions based on spend patterns. The Decision Engine may reject authorizations that do not fit the "traditional purchase profiles." For example, the ADE may REJECT the authorization requests under certain situations, such as: (1) when a card is used for a High Value Purchase (e.g., amounts over $1000) at a gas station, convenience store, etc.; (2) when a card is used repeatedly for a high value purchase multiple times in a day or short timer period (e.g., a purchase for four $1000 TVs in one day); (3) high deviation from acceptable spend patterns based on merchant locations, e.g., $200 at a fast food restaurant or convenient store; (4) inconsistent in-person purchases based on geographical locations, e.g., customer based in Delaware should be making purchases with physical card (which may be simulated) only in and around Delaware ZIP Codes. For example, this cardholder cannot make an 'Card Holder Present' transaction in California on the same day he is making purchases in Delaware. If a customer is travelling, then the ADE checks if a travel note has been entered in the records; or whether the previous pattern of spending indicates that the Customer was travelling. An embodiment of the present invention is directed to a tool that receives details on Card Numbers, Spend Limits, Details of Merchants, locations, rules about spending at merchant locations, mode of payment (e.g., Traditional Terminal, NFC Terminal, EMV Terminal, manual phone in, Online, etc.).

An embodiment of the present invention is directed to simulating an active population in its entirety rather than a smaller subset or sampling. For example, Active Credit Card Holder Populations may be in the tens of millions—and Total Card Holder Population is 100 million plus. According to an exemplary scenario, the AUT may have a card population of 100 million plus card holders. At any time, a third to a half of them may be "Active Users." Loading of 10s of millions of Card Numbers into the Load Test tool may be beyond its capabilities. Adding the "rules of spending" mentioned above to these millions of card numbers may be another challenging task.

The Testing Tool of an embodiment of the present invention is directed to simulating all (nearly all or a subset) of the active population. Rather than set parameters of the test and add data elements to the Load Testing Tool, an embodiment of the present invention is directed to: "recording" all (nearly all or a subset) the traffic coming in Production—making copies of the Authorization strings; copying the "Recorded" Log Files—which may be referred to as Authorization Logs ("ALOGS") to the LoadTest Servers (Secured); "loading" the ALOG files into individual Lines; and "replaying" the ALOG files along the individual Line handlers—so that an exact (or near exact, closely captured) 'Day' spend pattern is simulated.

As illustrated above, FIG. 3 is an exemplary illustration of a data collection framework, according to an embodiment of the present invention. Authorization data files may be received for a given time period, e.g., a day, 24 time period, and split into multiple files. Each file may be played against a single "line handler" on tandem. As shown in FIG. 3, Testing Tool 310 may send load volumes to System Under Test 320, where metrics may be gathered. System Under Test may include fault tolerant computer systems for processing applications requiring maximum uptime and zero data loss and Authorizations Application. The fault tolerant computer systems may use a number of independent identical processors and redundant storage devices and controllers to provide automatic high speed failover in the case of a hardware or software failure. As shown in FIG. 3, Data may be collected by a Data Collection Program 330 from a Production System 332 and then stored in a memory component. The memory component may include Custom Test Framework, Scenario Files, Data Parsing Files, Data Conversion Tools, Data Collection Tools and Actual Data Files, as shown by 340.

An embodiment of the present invention is directed to data parsing and loading scripts. Different Scripts may be used for various functions, including: Rename Incoming ALOG Files; Move renamed ALOG files to respective locations for different Lines; Switch ALOG files as needed (e.g., replace a used file with a fresh ALOG file); Clean up ALOG files after test (e.g., delete to comply with data privacy rules); Create Dummy ALOG files (e.g., create dummy files when there are no ALOGS; the dummy files may only be used to validate scripts and not AUT); and Combine days (e.g., join two sets of ALOG files to create large sets of data; this helps the system to run at larger volumes and for longer duration).

An embodiment of the present invention recognizes that Authorization Transactions are of a specific format called ISO8583. For ISO8583 Financial transaction card originated messages, Interchange message specifications represent the International Organization for Standardization standard for systems that exchange electronic transactions made by cardholders using payment cards. Challenges of the ISO8583 Auth message (EMV or NonEMV) may include: Mix of PlainText, HEX, EBCDIC HEX; Variable Length Fields and Variable Fields.

An embodiment of the present invention is directed to addressing the challenge of designing scripts to manipulate the ISO8583 format by replaying "ALOG" Files. For example, custom code may be implemented to ensure messages are validated and a specific RRN Field (e.g., DE37) is extracted. For example, the time taken for the round trip for each authorization may be measured. An exemplary Custom Jar described above in connection with FIG. 7 may also address the handling of the message.

FIGS. 8-11 illustrate an ISO8583 message format. ISO8583 defines a message format and a communication flow so that different systems may exchange transaction requests and responses. Transactions made at ATMs as well as transactions made when a customer uses a credit card to make a payment use ISO8583 in the communication chain. Mastercard and Visa networks and other institutions and networks base their authorization communications on the ISO8583 standard. Interchange message specifications is the International Organization for Standardization (ISO) standard for systems that exchange electronic transaction made by cardholders using payment cards. The system of an embodiment of the present invention applies performance volume testing using the ISO 8583 format.

Figure 8:
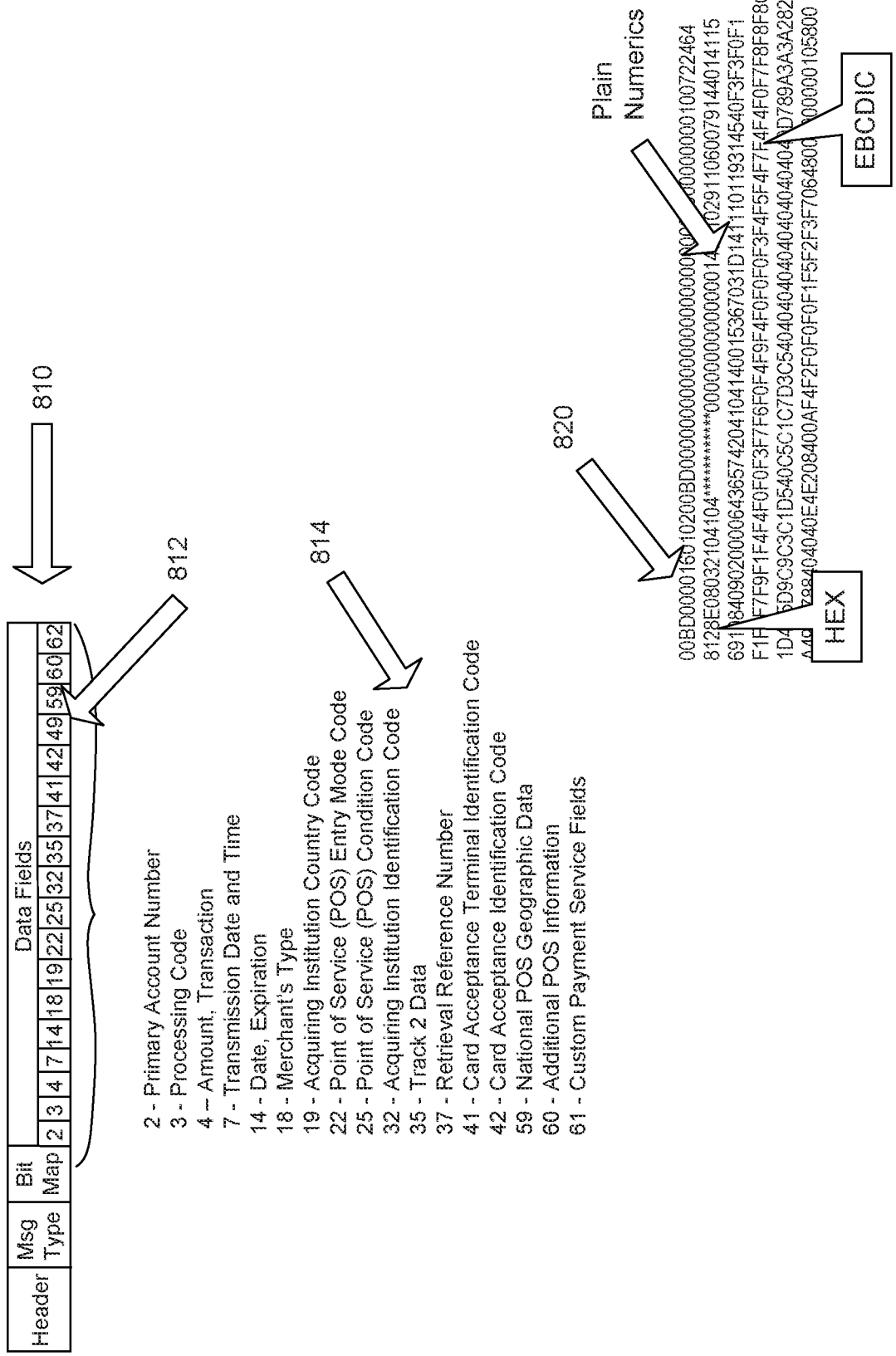
FIG. 8 is an exemplary message format.

FIG. 8 is an exemplary message format. As shown by Section 810, Auth Message ISO8583 has the following parts: Header, Message Type, BitMap and Data Fields (e.g., Hex, Plain, EBCDIC combination, etc.). Section 812 represents Data Elements between 49 and 69 in this example. Section 814 illustrates that fields present or not present may vary depending on Auth and Transaction. Next incoming transaction from Auth Log may have different sets of fields. For example, DE 55 starting position may not be guaranteed to be the same in every Auth. In the example, Section 820 represents an exemplary ISO8583 Auth Message. As shown by Section 820, the message may include a combination of Plaintext (e.g., plain numercis), HEX, EBCDIC HEX, etc.

FIG. 9 illustrates an exemplary ISO Message. FIG. 9 illustrates converting a Bit Map. In this example, Authorization Message ISO8583, represented by 910, has multiple parts, including a header, message type, bit map and data fields. FIG. 9 illustrates reading a BitMap Field; converting it to a Binary Field Map, referring to ISO Specifications to calculate the length of fields present and parsing each individual field, by reading first TLV and processing the length of the field.

FIG. 10 illustrates an exemplary ISO Message. The Test Message may include Header, Type of Message, Bitmap; PAN; Processing Code, Amount, POS Entry Mode; POS Condition Code; Acquiring Institution; Track2Data; RRN; Terminal ID; Card Acceptor information; Card Acceptor Name; Currency Code, Additional POS information and additional field(s).

EMV is a technical standard for smart payment cards and for payment terminals and automated teller machines that can accept them. EMV (Europay, MasterCard and Visa) cards may include smart cards (also called chip cards or IC cards) which store their data on integrated circuits rather than magnetic stripes, although many EMV cards also have stripes for backward compatibility. They may include contact cards that are physically inserted (or "dipped") into a reader, or contactless cards that may be read over a short distance using radio-frequency identification (RFID) technology or other communication technology. Payment cards that comply with the EMV standard may be referred to as chip-and-PIN or chip-and-signature cards, depending on the exact authentication methods required to use them.

Accordingly, a "Field 55" (i.e., DataElement 55-DE55) may be added to an existing ISO8583 message string that contains a "Cryptogram" generated by the Chip on the Card. The Cryptogram may be generated based on an algorithm that uses a public key of the issuing bank, elements like the "Transaction Counter," Spend Amount, etc. The cryptogram may be passed along as part of the ISO8583 string all the way to the issuer. The issuing system may take the card details and generate a Cryptogram of its own using its private key. If both Cryptograms match, then the Authorization transaction may be considered "Approved."

It is also possible for the issuing bank to send "Scripts" to these cards. For example, scripts may be "commands" that are sent to the POS Terminal which may execute on the card including forcing a pin change, blocking a card, adding restrictions, etc.

An embodiment of the present invention is directed to a custom tool with a data collection framework. For example, a test key related to the various bins that exists in a SUT may be inputted into the Tool of an embodiment of the present invention. The Tool may then take a non EMV "in person" ISO8583 transaction, and then using the test key, account number, expiry date, time of transaction, and/or other data, may generate a Cryptogram and insert it into the ISO8583 transaction. This message when replayed against the SUT may pass the approval process.

Figure 11:
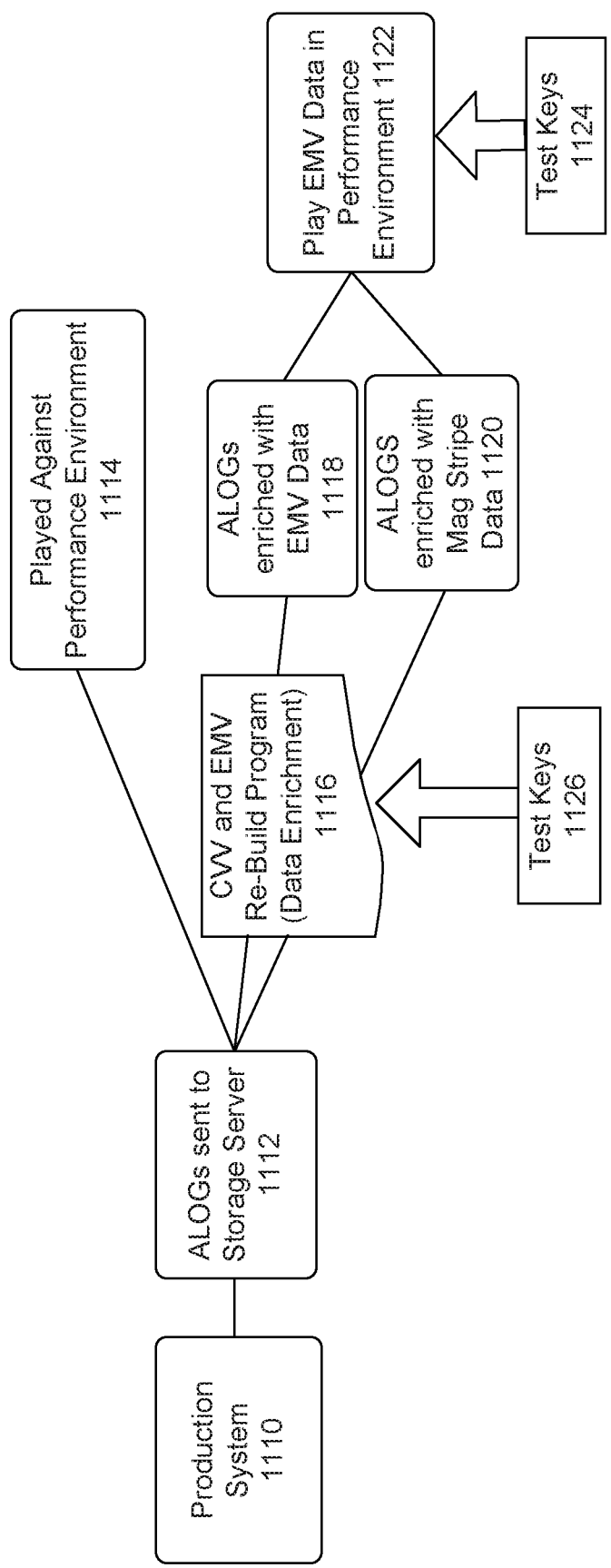
FIG. 11 is an exemplary data collection framework, according to an embodiment of the present invention.

FIG. 11 is an exemplary data collection framework, according to an embodiment of the present invention. An embodiment of the present invention may include a performance tool that includes Data Enrichment for EMV/DE55 cryptogram, for example. In addition to the EMV/DE55 cryptogram, the tool may be modified to generate CVV to get around keys constraints. EMV Cryptogram generation may be implemented.

As shown in FIG. 11, a production system 1110 may send ALOGs to a storage server, as shown by 1112. A traditional system may play against Performance Environment, as shown by 1114. An embodiment of the present invention is directed to Data Enrichment Platform, as shown by 1116. Encryption keys may be generated specifically for use in the Test System. The specifically generated encryption keys may be applied at 1126. For example, encryption keys may be used to generate a cryptogram in data fields. ALOGs may be enriched with EMV Data, as shown by 1118. Likewise, ALOGs may be enriched with magnetic stripe data, as shown by 1120. A process of an embodiment of the present invention may play EMV data in Performance Environment, as shown by 1122. Test keys may be applied at 1124. According to an exemplary illustration, the test key applied at 1124 may be the same as the test key shown in 1126.

Figure 12:
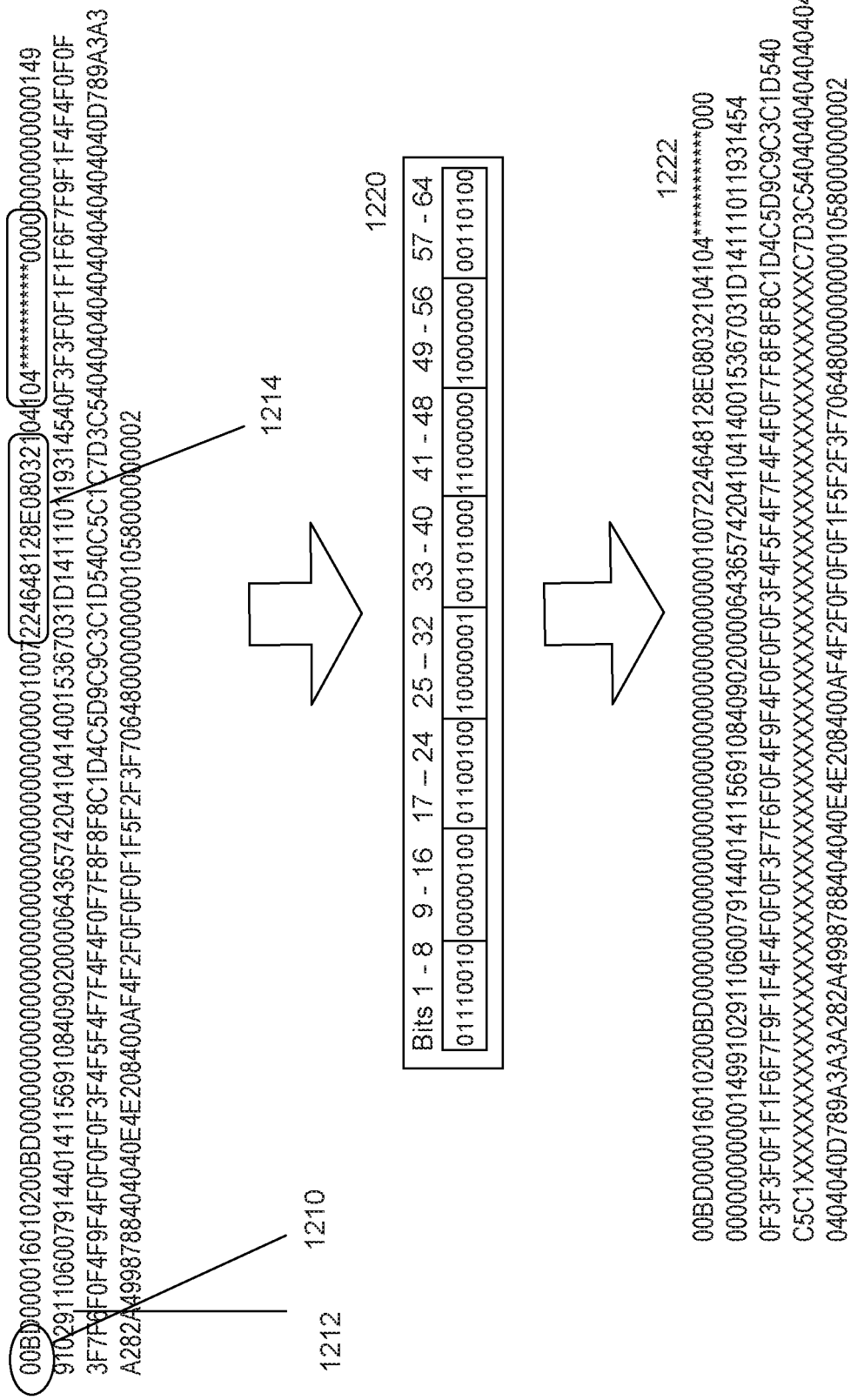
FIG. 12 is an exemplary illustration of a message format, according to an embodiment of the present invention.

FIG. 12 is an exemplary illustration of a message format, according to an embodiment of the present invention. FIG. 12 illustrates added complexity due to EMV (e.g., chip and PIN). Section 1210 illustrates a length field in HEX where calculating a length validates against the string. Section 1212 illustrates that DE55 occurs at different positions in the hex strings. Also, inserting DE55 starting position requires sub operations, including reading the BitMap field; converting it to Binary Field Map; referring to ISO Specifications to calculate the length of fields present; totaling the lengths of all fields present before 55th field to arrive at starting position of DE55; inserting DE55 field in existing Auth; calculating New Length of message; changing Length of message indicator in Header Field. A data parser may be implemented that converts the files. Section 1214 illustrates extracting a BitMap field value and converting to a binary format, represented by 1220. Bitmap may be processed against the latest ISO8583 message format specifications to determine what fields are there and calculate a combined length of all fields before DE55. This complex code may be written and change every time the ISO8583 format changes. An embodiment of the present invention is directed to Inserting a fixed DE55 string into Auth, calculating a length and updating the Length Field in the beginning of the string. An embodiment of the present invention takes into account the format conversion at every step of the operation, as shown in Section 1222.

An embodiment of the present invention recognizes that a Credit Card Authorizations system not only services the financial transactions—the Authorizations, but also the non-financial "Service" Transactions. The "Servicing" Transactions may come from an internal source—such as a Mainframe application that sends mainframe formatted messages over a TCP/IP Connection. For example, these message formats are different from the ISO8583 transaction. These "Servicing Volumes" can form up to approximately 50% of the Load Test volumes of the System Under Test.

According to an embodiment of the present invention, a Mainframe application may act as a bridge between an Authorizations System and a Load Test Tool. For example, a different load test instance may be used to send an MQ Message to a distributed server that may in turn pass it on to the mainframe program. The mainframe program may then convert the MQ message into its native format and pass it on to the System Under Test.

Figure 13:
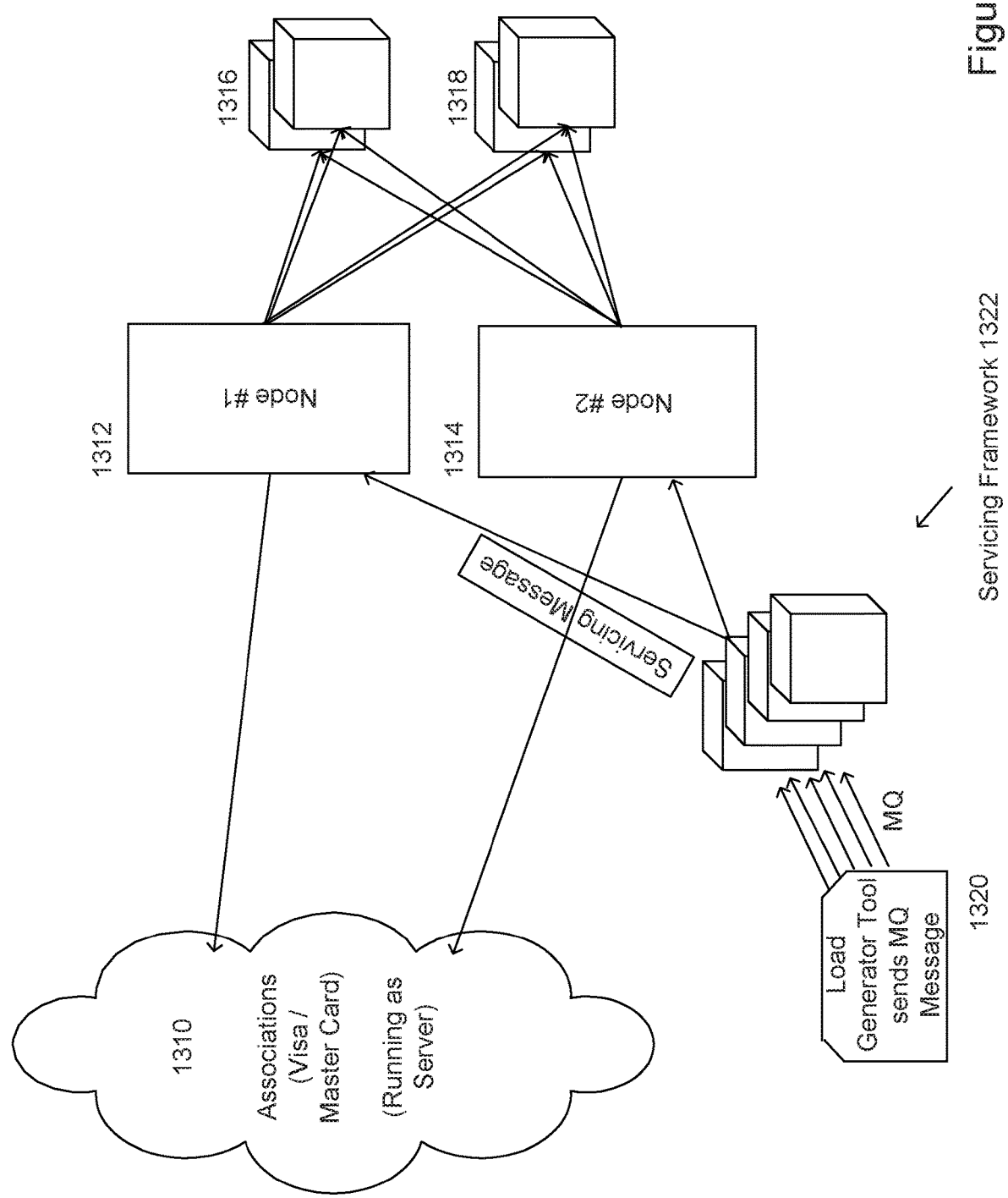
FIG. 13 is an exemplary system under test, according to an embodiment of the present invention.

FIG. 13 is an exemplary system under test, according to an embodiment of the present invention. Load Testing solution may simulate Associations represented by 1310. Node #1, represented by 1312, may connect to Associations 1310 like a client and fetch records. Similarly, Node #2, represented by 1314, may connect to Associations 1310 like a client and fetch records. Nodes 1312 and 1314 may communicate with Authorization Mainframe 1316 and Authorization Mainframe 1318. In this example, Mainframe 1316 and 1318 may each act as a Server. According to another example, Load Generator Tool 1320 may send MQ messages to Servicing Framework 1322. Servicing Framework 1322 may then send servicing messages to Nodes 1312, 1314. Other sources of data may also be represented and implemented.

An embodiment of the present invention is directed to an approach for test data generation in lieu of Production "Authorization Logs." There is a possibility that the Production Authorization Logs approach may be put on hold due to change control rules. Collecting Production logs require change controls to be approved and implemented to run the "Log collection" program on the production servers. If the Change control is not approved, then "Authorization Logs" may not be available to replay against the test system.

An embodiment of the present invention is directed to a testing system to generate data files in the absence of production ALOGS. These data files may contain the entire ISO8583 string that simulates an authorization occurring. An embodiment of the present invention provides a Data Generation Program within the framework that reads various input files (e.g., Customer Data, Merchant Data, Terminal Data, etc.) that contain individual data elements. The Data Generation Program may refer to an internal set of parameters for distribution patterns and inject its own data elements to build the entire ISO8583 strings that may be replayed against the test system.

Figure 14:
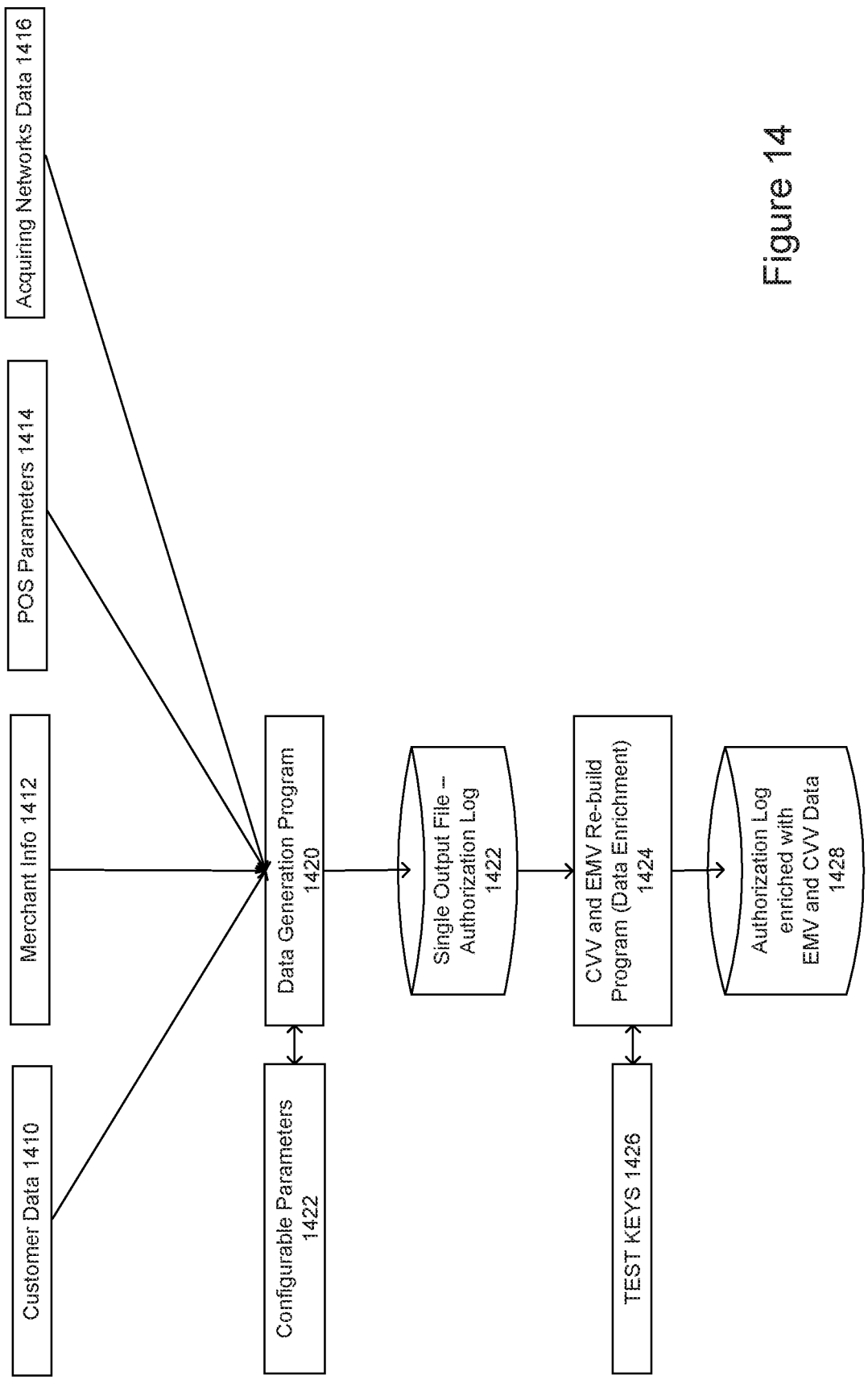
FIG. 14 illustrates a data generation program, according to an embodiment of the present invention.

FIG. 14 illustrates a data generation program, according to an embodiment of the present invention. As shown in FIG. 14, Data Generation Program may receive inputs from various sources, including Customer Data 1410, Merchant Information 1412, PoS Parameters 1414, Acquiring Networks Data 1416 and/or other data. Data Generation Program 1420 may also access configurable parameters, which may include distribution of card holder present or not present; online or telephone; merchant type distribution (e.g., groceries, gas stations, travel, etc.), variation in spend amount (e.g., $1 to $100 (80%), $100-$500 (10%), etc.), different bitmap types, etc.

As shown in FIG. 14, Data Generation Program 1420 may read input files from the various inputs. Data Generation Program 1420 may refer to configurable parameters, represented by 1422, for distribution details. The following elements may be injected, such as Amount, Transmission Date and Time; System Trace Audit Number, Country Code (e.g., Static), Retrieval Reference Number (RRN), Currency Code, etc.

Data Generation Program 1420 may then generate an output file 1422, including authorization logs. CVV and EMV Re-build Program may be executed for data enrichment, at 1424. For example, CVV and EMV Re-Build program may read the Authorization Logs and use Test Keys 1426 to re-build the Authorization Log with valid CVV and EMV fields, as shown by 1428.

An embodiment of the present invention recognizes that new emerging payments (e.g., Mobile Devices) may be introduced that may require an alternate methodology of Data Generation. For example, Mobile Device Payments may include: NFC Chip based, QR Code based; Simulated Card Swipe and In App Purchase. Other payment mechanisms and methodologies may be recognized.

According to an embodiment of the present invention, a System Under Test may need to be tested with two exemplary transactions, including Provisioning Calls (e.g., Token Create, Token Activate, etc.) and Authorization Calls (e.g., Token Authorization Calls, etc.).

An authorization may generate a different format that has additional fields about the Token Information and Encrypted Cryptogram, etc.

Additionally, Mobile Devices may generate "provisioning" transactions where the Mobile device registers with the System under test and receives a "Token." In the provisioning transaction, the Mobile Device may activate the Token with the System Under Test.

An embodiment of the present invention may involve Dummy Provisioning requests that are specific to Mobile Devices that generate 'Tokens' for Tokenization. In addition, a Tokenization file may be used in Data Generation for Generating Mobile based Token "Authorizations."

Figure 15:
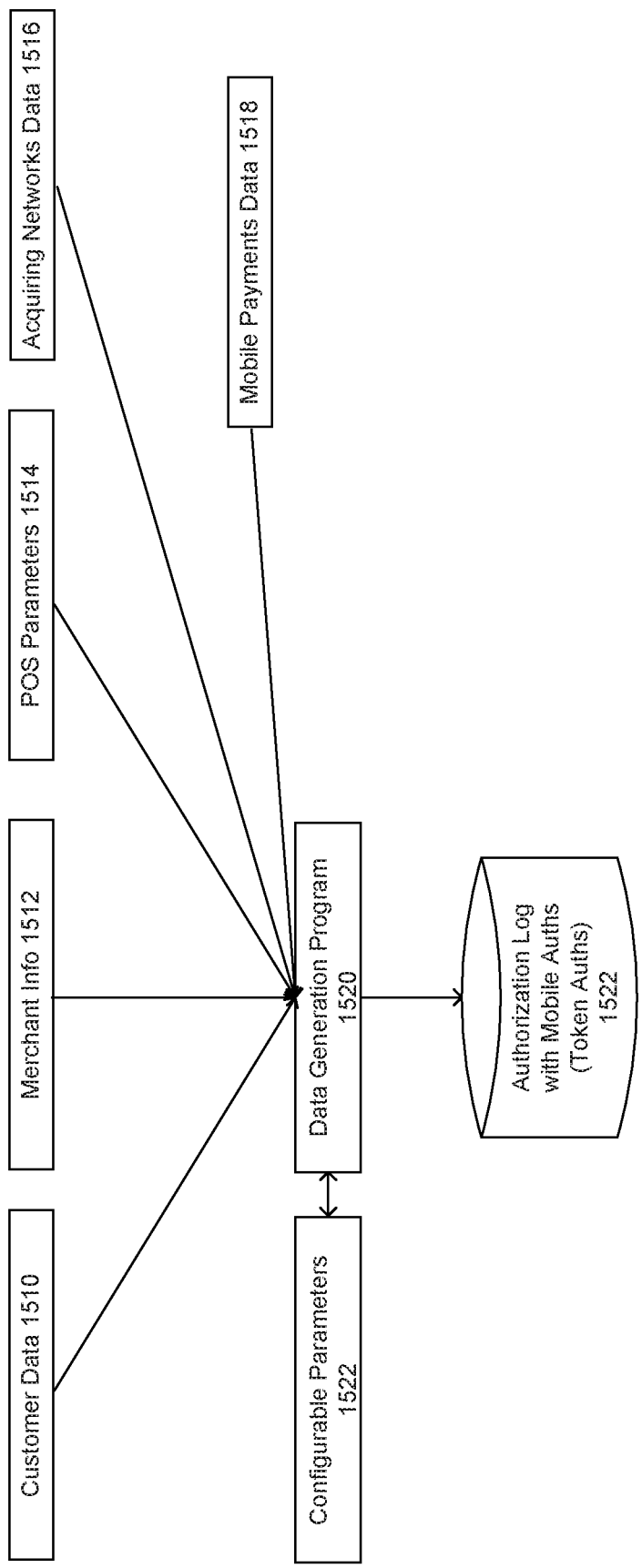
FIG. 15 illustrates a data generation program, according to an embodiment of the present invention.

FIG. 15 illustrates a data generation program, according to an embodiment of the present invention. As shown in FIG. 15, Data Generation Program 1520 may receive inputs from various sources, including Customer Data 1510, Merchant Information 1512, PoS Parameters 1514, Acquiring Networks Data 1516, Mobile Payments Data 1518 and/or other data. Data Generation Program 1520 may also access configurable parameters, which may include percentage of provisioning calls, percentage of mobile based token authorizations distributed by various mobile device channels (e.g., NFC, QR Code, In App and Simulated Swipe.

As shown in FIG. 15, Data Generation Program 1520 may read input files from the various inputs. Data Generation Program may refer to configurable parameters, represented by 1522, for distribution details. The following elements may be injected, such as Amount, Transmission Date and Time; System Trace Audit Number, Country Code (e.g., Static), Retrieval Reference Number (RRN), Currency Code, etc.

Data Generation Program 1520 may then generate an output file, including authorization logs with Mobile Authorizations, as shown by 1522.

An embodiment of the present invention is directed to Authorization Settlements. When Authorizations flew into the Authorization Tandem Systems, the Authorized amount of purchase, once approved, shows up as a temporary charge in the Card Holder system of record. When the purchase amount is settled with the merchant by the acquirer, the settlement files are routed via the Association to the Issuer. The Settlement files are applied through a batch process and the authorizations posted against the card holder's account.

Settlement involves the exchange of funds between a card issuer and an acquiring bank to complete a cleared transaction and the reimbursement of a merchant for the amount of each sale that has been submitted.

In the testing system, production logs may be executed against the system under test to simulate the Authorizations volume. When the production logs are replayed against the system of test, they are treated as a completely new authorizations with a new time stamp, which will generate their own unique tracking number called Approval Code. Accordingly, the Settlement files pulled from production will not work against the system under test as the Approval Codes in the settlement files do not match up with the authorizations that were replayed against the system. As a result in the System under test, the Card Holders have an increasing number of pending transactions that are never settled.

According to an embodiment of the present invention, when Authorization Logs are replayed against the System under test, the System Under test may respond to the authorization with an Approval Code. The framework of an embodiment of the present invention may capture the Approval Code and Timestamp in the response and then write it to a flat file along with the Retrieval Reference Number (RRN) that is present in an original Authorization Log.

According to an embodiment of the present invention, a separate Settlement file generator may use an output file as well as the original Authorization Log to generate the Settlement file in an appropriate format. The newly created Settlement file may be sent via File transfer to the system under test where it may then be processed via batch or other process. Because the file was created using actual Approval Codes stored in the system, the Settlement file will work and the customers will have their Pending Transactions converted into Posted Transactions.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical home or personal computer system, telephone, personal digital assistant (PDA) or other like device) whereby a user may interact with a network, such as a communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented simulation system that implements performance and volume simulation testing of a virtual system environment between a network and an institution, the virtual system environment simulating a real system environment, the simulation system comprising:

a memory component that stores performance and volume data for authorizations;

a communication interface that supports communication via Transmission Control Protocol/Internet Protocol (TCP/IP); and a simulation testing tool that simulates activities of all of a designated active population in its entirety using data collected from the designated action population to generate performance metrics and conduct volume stress testing of the virtual environment based on the real system environment, the simulation testing tool including a processor coupled to the memory component and programmed to:

collect data from one or more production logs of authorizations in a credit card authorization application in a standard message format including one or more cryptograms generated by smart cards with integrated circuits used for at least some of the authorizations in the one or more production logs, wherein the data is used to replay authorizations between the network and the institution against the authorization application;

parse data related to transaction authorizations, from the one or more production logs, in the standard message format for use in performance testing the authorization application;

verify one or more of new application code running on the virtual environment, maintenance releases on the virtual environment, and supporting hardware changes by stress testing the virtual environment between the network and the institution that authorizes applications and transactions between the network and the institution by sending the mainframe application production level workload volume wherein the production level workload volume comprised of the data parsed from the collected data of the one or more production logs and wherein the simulation system under test hosts the authorization application;

gather one or more performance metrics from the stress test of the mainframe application, wherein the performance metrics comprise finding a processing ceiling;

validate, based on the stress test, one or more failover and recovery scenario for the mainframe application, wherein the gathered performance metrics from the virtual environment provide a basis for operational changes in the real system environment;

implement the operational changes, wherein the implementing includes setting a maximum transaction per second; and prevent at least one client of the real system environment from overloading a processing system of the real system environment, wherein the preventing comprises limiting an amount of transactions executed by the authorization application to the maximum transactions per second, wherein the limiting comprises preventing each subsequent transaction from executing until after a predetermined amount of time has elapsed since a most recently executed transaction, wherein the predetermined amount of time comprises a duration of time that is equal to an inverse of the maximum transactions per second, and wherein the real system environment comprises a credit card authorization system.

2. The computer implemented simulation system of claim 1, wherein the production logs comprise daily authorization log files.

3. The computer implemented simulation system of claim 1, wherein the memory component stores scenario files, data parsing files, data conversion tools, data collection tools and data files.

4. The computer implemented simulation system of claim 1, where an asynchronous TCP/IP communication script is executed.

5. The computer implemented simulation system of claim 1, further comprising: an authorization decision engine that executes real-time approval decisions based on patterns.

6. The computer implemented system of claim 1, wherein the authorizations minor production patterns for an amount.

7. The computer implemented simulation method that implements performance and volume simulation testing of a virtual system environment between a network and an institution, the virtual system environment simulating a real system environment, the simulation method comprising:

simulating, via a simulation testing tool, activities of all of a designated active population in its entirety using data collected from the designated action population to generate performance metrics and conduct volume stress testing of the virtual environment based on the real system environment, the simulation testing tool including a processor coupled to the memory component and supporting communication via Transmission Control Protocol/Internet Protocol (TCP/IP);

collecting, via the testing tool, data from one or more production logs of authorizations in an authorization application in a standard message format including one or more cryptograms generated by smart cards with integrated circuits used for at least some of the authorizations in the one or more production logs, wherein the data is used to replay authorizations between the network and the institution against the authorization application;

parsing, via a testing tool, data related to transaction authorizations, from the one or more production logs, in the standard message format for use in performance testing the authorization application;

verifying one or more of new application code running on the virtual environment, maintenance releases on the virtual environment, and supporting hardware changes by stress testing the virtual environment between the network and the institution that authorizes applications and transactions between the network and the institution by sending the mainframe application production level workload volume wherein the production level workload volume is comprised of the data parsed from the collected data of the one or more production logs and wherein the simulation system under test hosts the authorization application;

gathering one or more performance metrics from the stress test of the mainframe application, wherein the performance metrics comprise finding a processing ceiling;

validating, based on the stress test, one or more failover and recovery scenario for the mainframe application, wherein the gathered performance metrics from the virtual environment provide a basis for operational changes in the real system environment;

implementing the operational changes, wherein the implementing includes setting a maximum transaction per second; and preventing at least one client of the real system environment from overloading a processing system of the real system environment, wherein the preventing comprises limiting an amount of transactions executed by the authorization application to the maximum transactions per second, wherein the limiting comprises preventing each subsequent transaction from executing until after a predetermined amount of time has elapsed since a most recently executed transaction, wherein the predetermined amount of time comprises a duration of time that is equal to an inverse of the maximum transactions per second, and wherein the real system environment comprises a credit card authorization system.

8. The computer implemented simulation method of claim 7, wherein the production logs comprise daily authorization log files.

9. The computer implemented simulation method of claim 7, wherein the memory component stores scenario files, data parsing files, data conversion tools, data collection tools and data files.

10. The computer implemented simulation method of claim 7, where an asynchronous TCP/IP communication script is executed.

11. The computer implemented simulation method of claim 7, further comprising:

executing, via an authorization decision engine, real-time approval decisions based on patterns.

12. The computer implemented simulation method of claim 7, wherein the authorizations minor production patterns for an amount.

* * * * *